Aug. 29, 1950 G. KUNERT 2,520,844
DEVICE FOR DUMPING TRUCKS
Filed Aug. 7, 1946 2 Sheets-Sheet 1
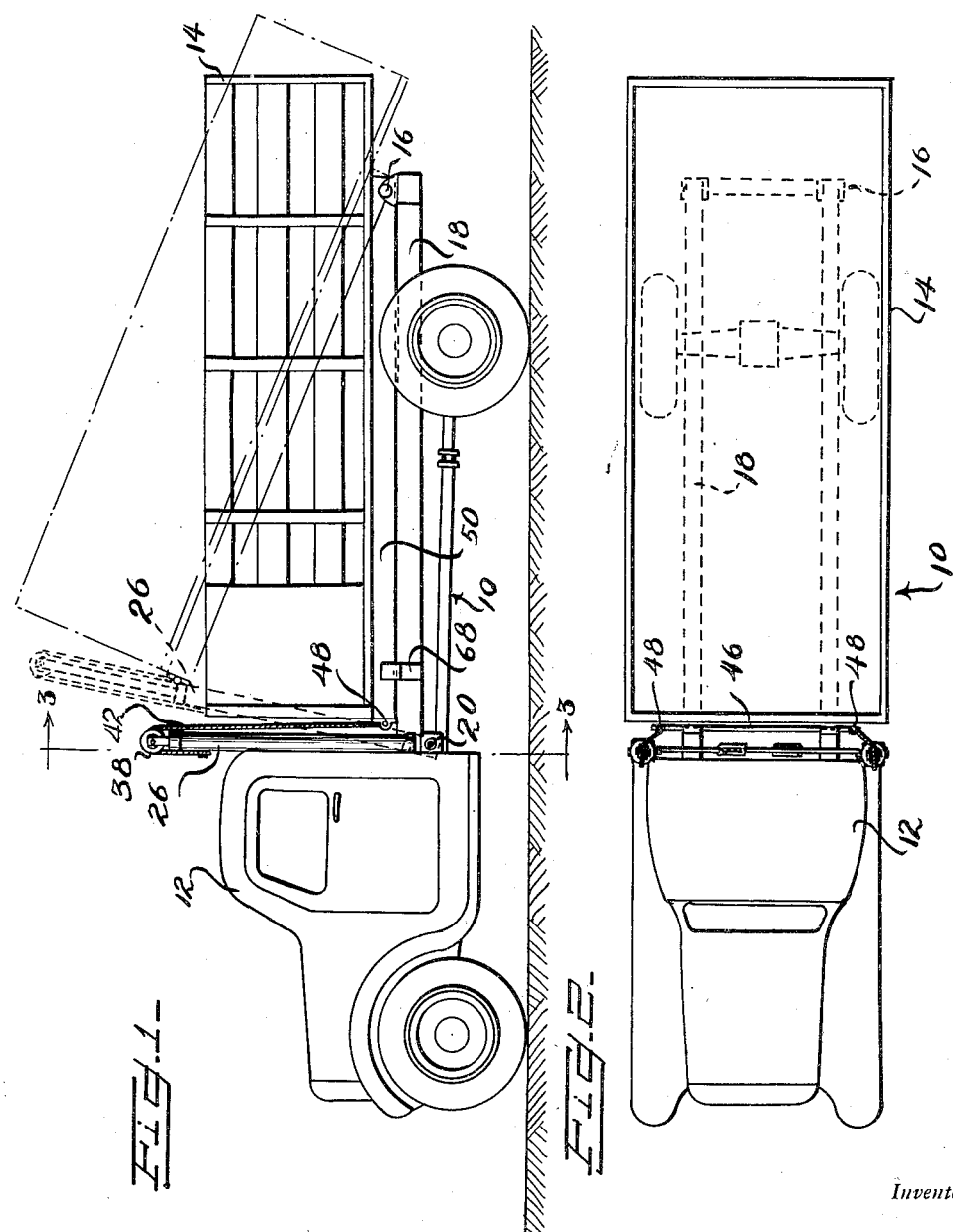
Inventor
George Kunert
By Clarence A. O'Brien
and Harvey B. Jackson
Attorneys

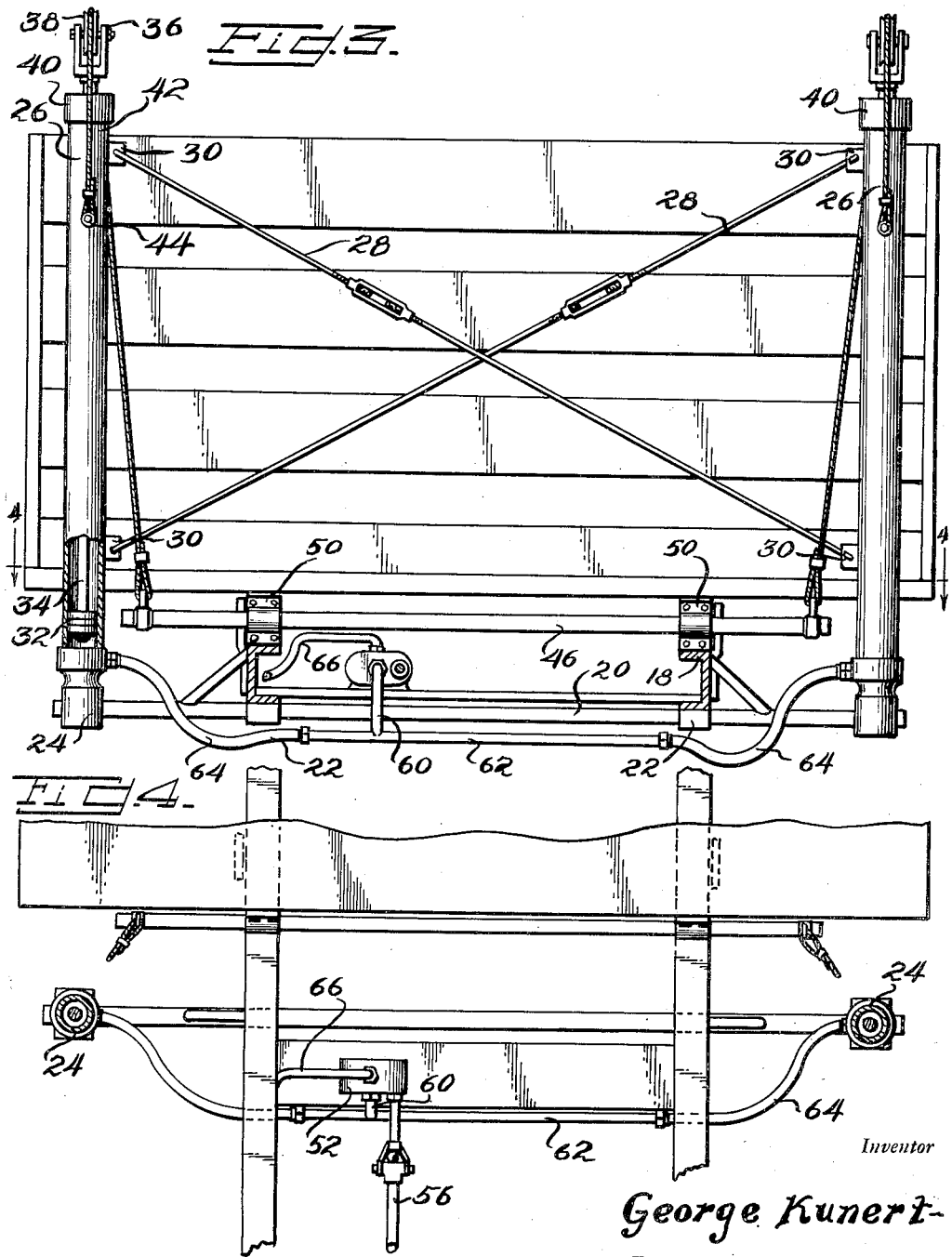

Patented Aug. 29, 1950

2,520,844

UNITED STATES PATENT OFFICE 2,520,844

DEVICE FOR DUMPING TRUCKS

George Kunert, Humboldt, Iowa

Application August 7, 1946, Serial No. 688,935

1 Claim. (Cl. 298—22)

My invention has reference to a device for dumping trucks and more especially pertains to an improved hydraulic lift for elevating bodies which are pivoted to a vehicle frame.

The principal purpose of my invention resides in providing a power operated mechanism for elevating truck dump bodies, which is compact, inexpensive, easily installed, sturdy and reliable in operation.

Additional aims of the invention consist in devising an apparatus in accordance with the foregoing objects, wherein the device is conveniently positioned upon a truck, has an amplified lifting movement and has its thrust applied always to the line of movement of the body.

These, together with numerous other objects which will later become apparent as the following description proceeds, are attained by a device, one embodiment of which has been illustrated by way of example only in the accompanying drawings wherein:

Figure 1 is a side elevational view of a dump truck showing my invention applied thereto;

Figure 2 is a top plan view of Figure 1;

Figure 3 is a vertical sectional view taken substantially upon the line 3—3 of Figure 1; and Figure 4 is a horizontal sectional view being taken substantially upon the line 4—4 of Figure 3.

Referring now more particularly to the annexed drawings, numeral 10 denotes generally a motor truck having a conventional type of cab 12, and a dump body 14 pivoted as at 16 to the chassis or frame of the vehicle as at 18.

In Figure 2, the body 14 is shown in full lines in its normal, lowered position, while the dotted line view illustrates the body in its elevated dumping position. As shown best in Figure 3, the shaft 20 is journaled in suitable bearings 22 secured below the frame members 18. Rigidly carried by the shaft 20 at its extremities and outside the frame members 18, are a pair of hydraulic cylinders 24 having barrels 26 extending upwardly above the upper surface of the dump body 14. A pair of reenforcing rods or other crossed members 28 are secured to spaced lugs 30 carried upon the cylinders 26 for the purpose of rigidly securing the latter in relation to each other. Slidable in the lower end of cylinders 26, are a pair of pistons 32 having upwardly extending rods 34 which extend slightly above the upper ends of the cylinders 26 when the body and the pistons are in their lowered position. At their upper ends, the rods 34 are provided with forks 36 journaling a pulley 38 for a purpose to be now described. Cap members 40 at the upper ends of the cylinders 26 provide means for enclosing the cylinders and also for guiding the rods in their vertical reciprocatory movements. A steel cable 42 or other suitable flexible support, has its lower end secured as at 44 to a portion of the cylinder 26, and the cable 42 is then passed over the pulley 38 and has its lower end secured to an extremity of a cross bar 46 as at 48. The cross bar 46 extends through a pair of longitudinally extending beams 50 which form the sills of the dump body 14 and, in the lowered position of the latter rests upon the frame members 18 of the vehicle chassis, as shown clearly in Figure 3.

As shown more clearly in Figures 3 and 4, a hydraulic pumping unit 52 is secured in any suitable manner between the frame members 18 of the vehicle and is driven from the conventional power take-off shaft 56 of the chassis. A suitable control means (not shown) is provided for selectively controlling the operation of pump 52 for a purpose to be set forth later. A conduit 60 extends from the outlet side of pump 52 and communicates with a manifold or passage 62 connected as by flexible hose 64 to the hydraulic chambers below the pistons 32. A suitable fluid return line 66 extends from the hydraulic cylinders back to the inlet side of the pump it being understood that the control means controls the flow of fluid to and from the pump. It will thus be seen that by proper manipulation of the control means the pump 52 driven from the power-take-off 56 is caused to supply fluid under pressure through the passage 60 and manifold 62 to the flexible coupling 64 and thence to the hydraulic chamber below each piston 32. As the hydraulic piston 32 is caused to ride in the cylinder 26, the pulley 36 lifts the cable 42, one end 44 of which fastened or anchored, and thereby raises the cross-bar 46 tips the body 14 about its axis 16. When it is desired to lower the body, the control means is manipulated and the pump 52 reverses the flow of fluid and permits or causes the descent of pistons 32 and the attached body 14. It will be appreciated, that by means of the arrangement of the cable 42, the motion of the piston is amplified whereby the ends of the cable at 48 possess twice the upward movement of the pulley 38. It should be noted, that the hydraulic jacks 26, are pivoted upon the vehicle chassis and are free to oscillate in conformity with the position of the truck body in view of their connection thereto by the cable 42.

In order to insure the stability of the body when in its lowered position upon the chassis 18, a pair of upwardly extending pins 68 carried by the frame 18 are releasably engaged in corresponding recesses in the beams 50.

I wish to call attention to the convenient arrangement of the hydraulic jacks between the truck body and the truck cab, which arrangement causes no increase in either the overall length or in the width of a conventional type of dump truck. Moreover, by reason of the amplification of movement of pistons as transmitted to the truck bodies, the overall height of the device may conform to the usual clearance of a vehicle thus facilitating its use in various environments. The tipping of the hydraulic jacks upon the vehicle chassis, serves to insure that the resulted thrust of the hydraulic lift is always applied to the direction of movement of the vehicle, thereby minimizing the wear upon the device, increasing its mechanical efficiency and minimizing any tendency of the mechanism to bind. As it will be apparent that the principles of this invention may be applied to various modified structures, I do not wish to limit myself to the exact structure disclosed, but may avail myself with any suitable modification within the scope of the amended claim.

I claim as my invention:

In combination with a truck having a cab, a frame, and a dump body pivoted on said frame, a hydraulic lift for said body including, a pair of cylinders pivoted to said frame, a fluid supply line to each of said cylinders, a fluid pressure pump connected to said supply line, operating means connecting said pump to a power take-off of said truck, a piston in each cylinder and flexible connecting means between each piston and said dump body, said flexible means including a pulley journaled upon each piston and cable means extending over each pulley and having one end secured to a portion of said truck dump body and the other end secured to said cylinder, said cables having their first end secured to opposite extremities of a cross-bar extending underneath said dump body.

GEORGE KUNERT.

REFERENCES CITED

The following references are of record in the file of this patent:

UNITED STATES PATENTS

| Number | Name | Date |
| --- | --- | --- |
| 1,728,460 | Weber et al. | Sept. 17, 1929 |
| 2,326,594 | Wood | Aug. 10, 1943 |